(12) United States Patent
Murabe

(10) Patent No.: US 10,213,667 B2
(45) Date of Patent: Feb. 26, 2019

(54) COLLAPSIBLE TRANSPORT CARRIAGE

(71) Applicant: MS-TRADE GMBH, Ismaning (DE)

(72) Inventor: Shoichi Murabe, Ismaning (DE)

(73) Assignee: MS-Trade GmbH, Ismaning (DE)

( * ) Notice: Subject to any disclaimer, the term of this patent is extended or adjusted under 35 U.S.C. 154(b) by 27 days.

(21) Appl. No.: 14/911,255

(22) PCT Filed: Aug. 7, 2014

(86) PCT No.: PCT/EP2014/066998
§ 371 (c)(1),
(2) Date: Feb. 9, 2016

(87) PCT Pub. No.: WO2015/018898
PCT Pub. Date: Feb. 12, 2015

(65) Prior Publication Data
US 2016/0184676 A1   Jun. 30, 2016

(30) Foreign Application Priority Data

Aug. 9, 2013   (DE) .................. 10 2013 013 339

(51) Int. Cl.
*B62B 1/00*   (2006.01)
*A63B 55/60*  (2015.01)
(Continued)

(52) U.S. Cl.
CPC .............. *A63B 55/60* (2015.10); *A63B 55/61* (2015.10); *B62B 3/02* (2013.01); *B62B 3/106* (2013.01);
(Continued)

(58) Field of Classification Search
CPC ....... B62B 3/02; B62B 3/12; B62B 2202/404; B62B 2205/12; B62B 2205/18
(Continued)

(56) References Cited

U.S. PATENT DOCUMENTS 6,478,315 B1   11/2002  Manesis
6,719,319 B2 *  4/2004  Liao ................... B62B 1/045
                                                     280/62

(Continued)

FOREIGN PATENT DOCUMENTS

CN   201239495 Y   5/2009
CN   102886131 A   1/2013
(Continued)

OTHER PUBLICATIONS

ISA European Patent Office, International Search Report of PCT/EP2014/066998, Netherlands, 4 pages.
(Continued)

*Primary Examiner* — Toan C To
(74) *Attorney, Agent, or Firm* — McCoy Russell LLP

(57) ABSTRACT

The invention relates to a three-wheeled transport carriage, in particular for a golf bag, comprising a first elongated frame part and a second elongated frame part which can be pivoted relative to the first frame part and on the front end of which a front wheel is pivotally attached via a wheel holding bracket. The two rear wheels are hinged to a cross-member in the hinge region between the first and second frame parts in a pivotal manner about approximately 90°.

17 Claims, 8 Drawing Sheets

(51) Int. Cl.
*B62B 5/00* (2006.01)
*B62B 3/02* (2006.01)
*B62B 3/12* (2006.01)
*B62B 3/10* (2006.01)

(52) U.S. Cl.
CPC .............. *B62B 3/12* (2013.01); *B62B 5/0033* (2013.01); *B62B 5/0043* (2013.01); *B62B 5/0046* (2013.01); *B62B 2202/404* (2013.01); *B62B 2205/12* (2013.01); *B62B 2205/24* (2013.01)

(58) Field of Classification Search
USPC ... 280/40, 47.315, 47.34, 62, 642, 643, 651, 280/654
See application file for complete search history.

(56) References Cited

U.S. PATENT DOCUMENTS

| | | | |
|---|---|---|---|
| 6,863,237 B2 | 3/2005 | Bayer et al. | |
| 7,000,939 B2 | 2/2006 | Shapiro | |
| 7,128,333 B2* | 10/2006 | Reimers | B62B 1/045 280/651 |
| 7,137,644 B2* | 11/2006 | Kimberley | B62B 3/12 280/651 |
| 7,219,920 B2* | 5/2007 | Lin | B62B 1/045 280/47.24 |
| 7,934,729 B2* | 5/2011 | Murphy | A63B 55/00 280/47.17 |
| 8,191,920 B2* | 6/2012 | Zhang | B62B 3/02 280/47.26 |
| 8,500,140 B1* | 8/2013 | Liao | B62B 7/10 280/38 |
| 8,544,871 B1* | 10/2013 | Liao | B62B 3/02 280/62 |
| 2011/0181027 A1 | 7/2011 | Zhang | |
| 2012/0112436 A1* | 5/2012 | Liao | B62B 3/02 280/651 |
| 2016/0176427 A1* | 6/2016 | Liao | B62B 3/025 280/642 |

FOREIGN PATENT DOCUMENTS

| | | |
|---|---|---|
| DE | 202005018936 U1 | 2/2007 |
| DE | 102006057156 A1 | 6/2007 |
| DE | 202012101886 U1 | 8/2012 |
| DE | 202012102658 U1 | 10/2012 |
| TW | I247700 B | 1/2006 |

OTHER PUBLICATIONS

State Intellectual Property Office of the People's Republic of China, Office Action and Search Report Issued in Application No. 201480051898.3, dated Mar. 27, 2017, 13 pages. (Submitted with Partial Translation).

* cited by examiner

COLLAPSIBLE TRANSPORT CARRIAGE

CROSS REFERENCE TO RELATED APPLICATIONS

The present application is a U.S. National Phase of International Patent Application Serial No. PCT/EP2014/066998, entitled "COLLAPSIBLE TRANSPORT CARRIAGE," filed on Aug. 7, 2014, which claims priority to German Patent Application No. 10 2013 013 339.4, entitled "COLLAPSIBLE TRANSPORT CARRIAGE," filed on Aug. 9, 2013, the entire contents of each of which are hereby incorporated by reference for all purposes.

FIELD OF THE INVENTION

The invention relates to a collapsible transport carriage, in particular for golf bags, comprising three wheels at a collapsible and/or foldable frame.

BACKGROUND AND SUMMARY

Such a three-wheeled transport carriage is, for instance, known from U.S. Pat. No. 6,863,237 or U.S. Pat. No. 7,000,939. Here, a frame bracket extending obliquely from the handle to the front wheel in the operating position is provided, at the front end of which the front wheel is attached while the two rear wheels are supported via struts on the oblique frame bracket. For collapsing, the struts are folded to the frame bracket and the rear wheels are pivoted in the plane of the frame bracket while the front wheel which lies, in the operating position, with its rotational axis approximately in the plane of the frame bracket is pivoted transversely to the driving direction and then folded in the plane of the frame bracket. This construction is especially suitable as a jogging scooter, but is also intended to be used for transport purposes, for instance, as a transport carriage for golf bags.

It is an object of the invention to develop a transport carriage of the initially-mentioned kind such that it is adapted in particular for the transport of golf bags and has a simple construction easy to collapse.

In accordance with the invention this object is solved by a three-wheeled transport carriage, in particular for a golf bag.

There is provided a three-wheeled transport carriage, in particular for a golf bag, comprising:
  a first elongated frame part having at one end thereof,
  a second elongated frame part hinged thereto with an end thereof, which second elongated frame part can be pivoted relative to the first frame part,
  and at the free end of which a front wheel is pivotally attached via a wheel holding bracket with a pivot axis by which the wheel plane is pivotable about approximately 90°,
  wherein the two rear wheels are hinged in a pivotal manner to the end regions of an elongated cross-member, the elongated cross-member being arranged in the hinge region between the first frame part and the second frame part, such that the wheel plane can be pivoted from a position approximately perpendicular to the cross-member to a position approximately parallel to the cross-member, and vice versa.

Due to the fact that only two frame parts which are positioned at an angle relative to each other in the operating position are folded, wherein the rear wheels are folded in the frame plane and the front wheel is only twisted in the plane of the frame parts, there results a simple structure with easy handling during collapsing and unfolding while the weight of the transport carriage can also be kept low.

Advantageously, the rear wheels are hinged by guide rods between the free end of the first or second frame parts and axle beams of the rear wheels such that on pivoting of the frame parts relative to each other the plane of the rear wheels is pivoted about approximately 90° relative to the cross-member. As a result of this, the rear wheels are automatically pivoted to the carrying or operating position when the frame parts are pivoted relative to each other.

The cross-member may be connected rigidly with the first frame part at the lower end thereof, for instance, by welding. The cross-member may be connected rigidly with the second frame part and attached to the lower end of the first frame part in a pivotable manner via a bracket. As a result of this it is possible to position the rear wheels at the same side as the front wheel in the carrying position in that the rear wheels are attached in the operating position at the rear side of the cross-member seen in the driving direction and the cross-member is, when the second frame part is folded up, pivoted such that the rear wheels are positioned by the guide rods on the side of the front wheel therebelow.

Advantageously, the rear wheels are hinged to the cross-member in a pivotal manner about approximately 90° by axle beams, wherein the rear wheels are rotatably mounted on these axle beams.

An electrical drive motor for the rear wheels may be integrated in the axle beams.

For extending the support of the transport carriage by the front wheel, the wheel holding bracket may be designed to be extended and retracted relative to the second frame part along the pivot axis of the wheel holding bracket, so that the front wheel may be extended in the operating position and retracted in the carrying position.

A support device for the operating position which holds the two frame parts at an angle relative to each other may be provided advantageously between the first and second frame parts. This support device may be designed as a toggle lever. The two lever sections thereof are pivotable relative to each other and hinged to the first and second frame parts. However, a different support device, for instance, in the form of a spring may also be provided between the two frame parts.

For comfortably moving the transport carriage in the operating position, a handle may be hinged in a pivotal manner to the free end of the first frame part, said handle being adapted to be pivoted away from the first frame part in the operating position and being pivoted back approximately parallel to the first frame part in the carrying position, wherein in the two end positions a spring-loaded locking device or a locking device provided with a snap device may be provided for fixing the positions.

At the first and second frame parts, a respective holding and/or support device for a golf bag or an elongate good to be transported is expediently attached, wherein, for the transport of a golf bag, a curved plug-in bracket to be plugged into tongues on the golf bag is expediently attached to the first frame part and a holder projecting from the second frame part is attached to the second frame part for supporting the golf bag.

BRIEF DESCRIPTION OF THE FIGURES

Exemplary embodiments of the invention will be explained in more detail in the following drawings. Although the drawings are to scale, other relative dimensions may alternatively be used.

DETAILED DESCRIPTION

Figure 1:
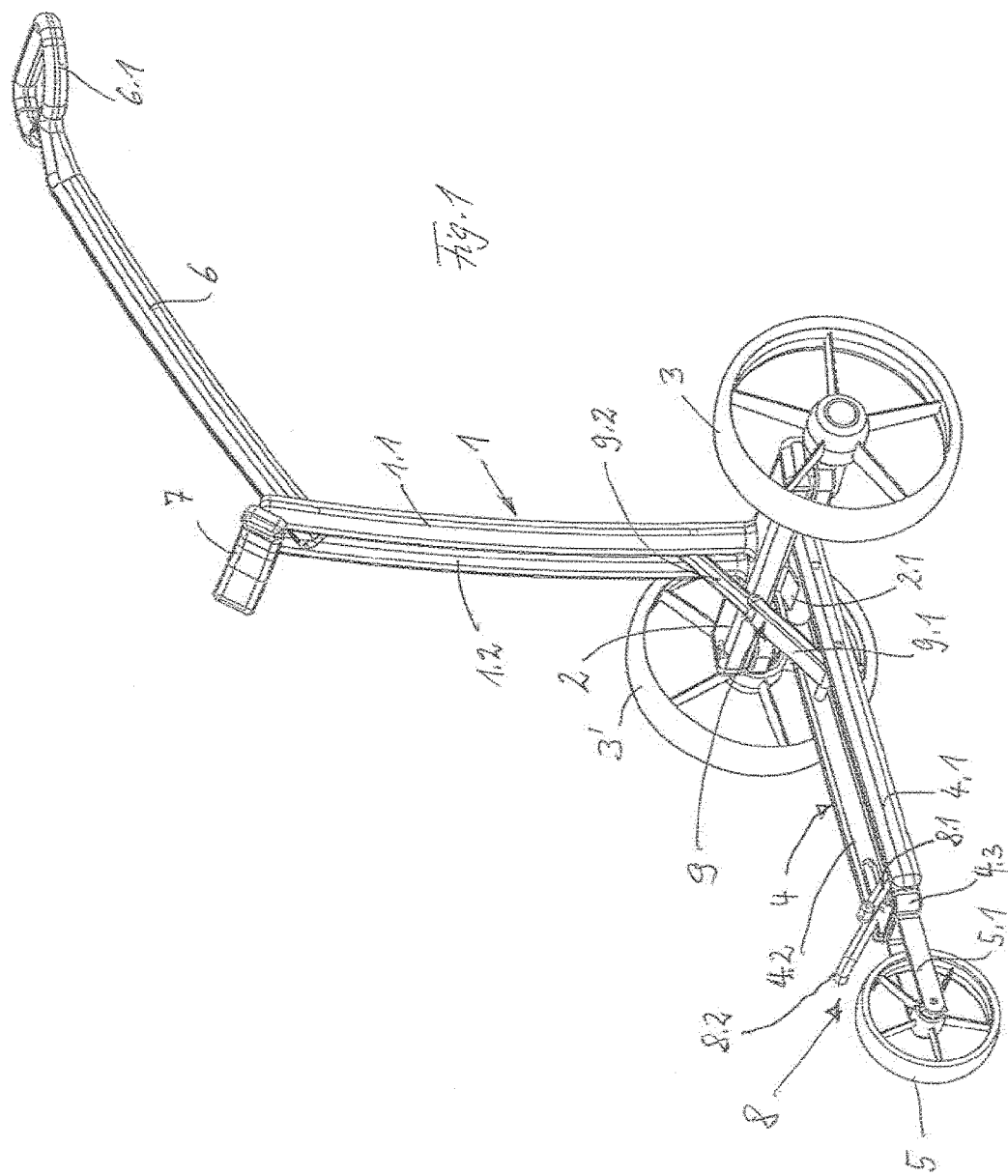
FIG. 1 is a perspective view of a first embodiment of the transport carriage in the operating and/or driving position.

The transport carriage designed as a golf bag caddy in FIG. 1 comprises, in the operating position, an upright first elongated frame part 1 with a cross-member 2 at the lower end, having rotatable rear wheels 3 and 3' hinged in a pivotal manner to the opposite ends thereof with their rotational axis. A second elongated frame part 4 having a rotatable front wheel 5 hinged in a pivotal manner to the front end thereof with its rotational axis extends horizontally from the lower end of the upright first frame part 1.

In the illustrated embodiment the upright first frame part 1 consists of two parallel tube bodies 1.1 and 1.2 which are rigidly connected by a welding connection with the cross-member 2 which may be designed as a rectangular tube. At the upper end, a handle 6 provided with a grip 6.1 at the free end thereof is attached in a pivotal manner between the tube bodies 1.1 and 1.2. Furthermore, a curved plug-in element 7, the opposite ends of which are adapted to be plugged into tongues of a golf bag which is not illustrated so as to keep the golf bag on the caddy in an upright position, is fastened to the upper end of the upright first frame part 1.

Figure 2:
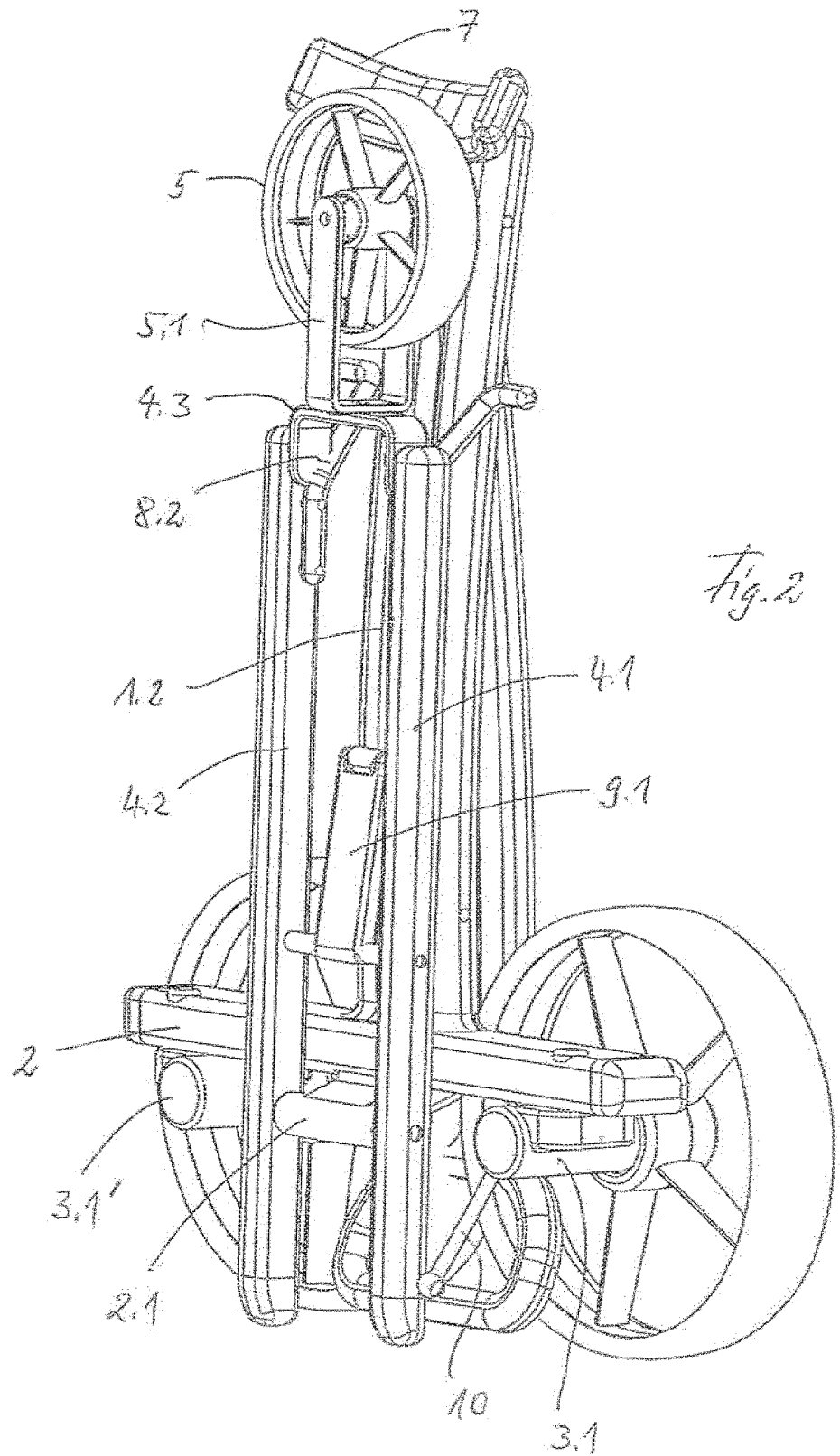
FIG. 2 is a perspective view of the transport carriage in the transport position.

FIG. 2 illustrates an attachment 2.1 in the middle of the cross-member 2 which projects forward in the driving direction and to which two frame struts 4.1. and 4.2 of the second frame part 4 which is horizontal in the operating position of FIG. 1 are hinged. The second frame part 4 is designed approximately U-shaped with the two frame struts 4.1 and 4.2 as legs and a bracket 4.3 as a strut. To this bracket 4.3 a wheel holding bracket 5.1. is hinged with a pivot axis in the longitudinal direction of the frame struts 4.1 and 4.2 such that the wheel holding bracket 5.1 can, after releasing a lock, be pivoted such that the plane of the front wheel 5 lies in the plane of the frame struts 4.1 and 4.2, as is illustrated by the carrying position in FIG. 2. Approximate may refer to elements that are within 0-5%, for example, of such values or that would reasonably be referred to as such a shape.

As a lock between the wheel holding bracket 5.1 and the bracket 4.3 at the second frame part 4 an engaging member may be provided on one of the two components which engages in a recess on the other component, wherein the respective engaging position is spring-loaded.

Figure 5:
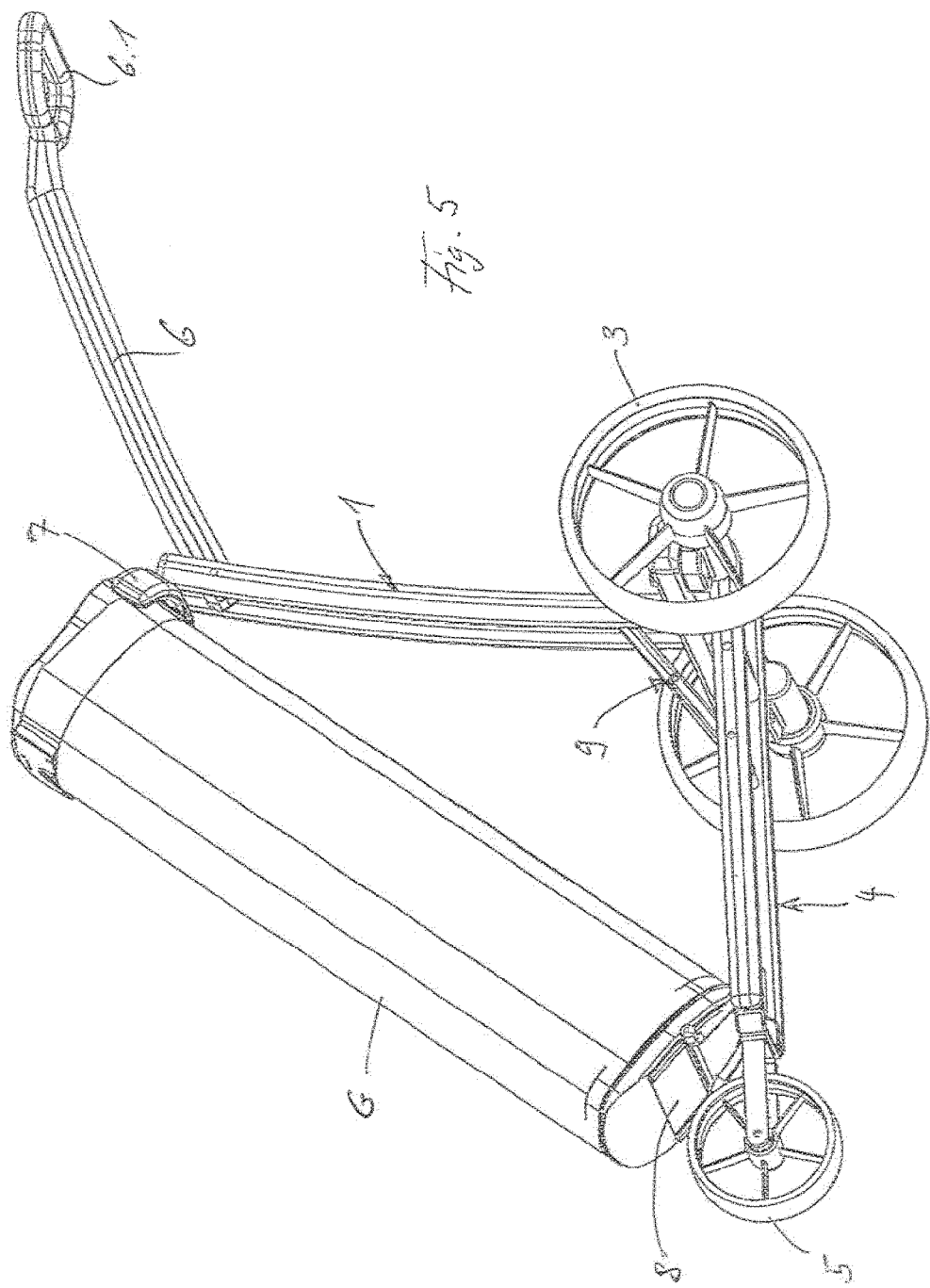
FIG. 5 shows a golf bag on the transport carriage in the operating position.

To the front ends of the two frame struts 4.1 and 4.2 there is fastened a respective support 8 which is, for instance, formed by an angled rod, said support 8 projecting obliquely forward and upward from the second frame part 4 in the operating position, so that a golf bag G placed on the second frame part 4 is supported in the longitudinal direction, as is illustrated in FIG. 5.

Figure 3:
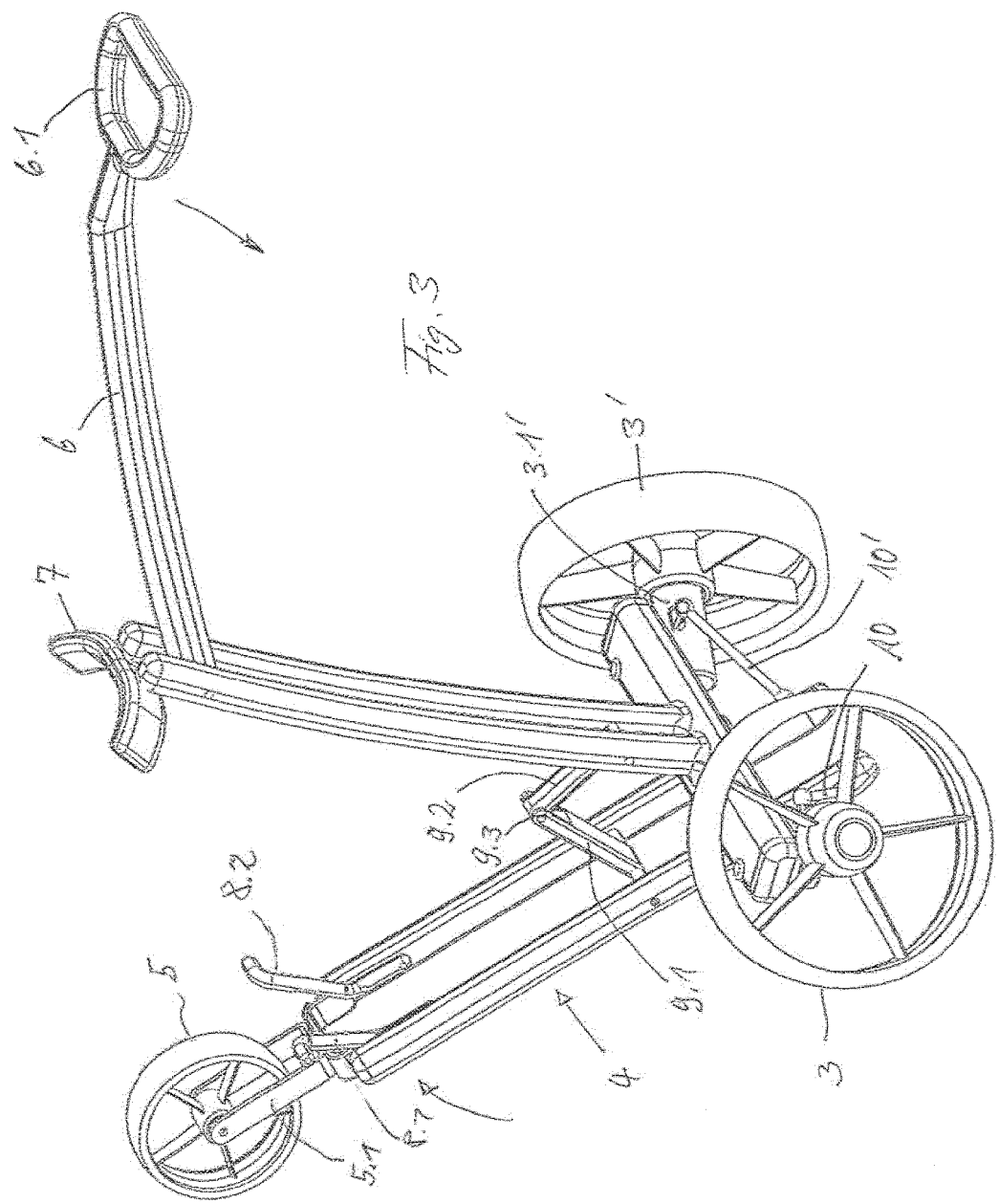
FIG. 3 and FIG. 4 show intermediate positions during collapsing of the transport carriage from the operating position in FIG. 1 to the carrying position in FIG. 2 or vice versa.

Between the frame parts 1 and 4 a toggle lever 9 is hinged close to the cross-member 2 respectively between the frame struts 4.1, 4.2 and the tube bodies 1.1, 1.2, said toggle lever 9, in its stretched position, in the operating position of FIG. 1, holding the two frame parts 1 and 4 at an angle of approximately 90° to one another and being foldable by a hinge connection 9.3 in the middle region between the toggle lever parts 9.1 and 9.2, as is illustrated by the intermediate position in FIG. 3.

It is, however, also possible to omit a support in the form of the toggle lever 9, so that the golf bag G, which rests on the second frame part 4 and is suspended on the first frame part 1, serves for stabilization of the two frame parts 1 and 4 relative to each other in the operating position, as may be seen in FIG. 5.

In the first embodiment, to the ends of the cross-member 2 respective axle beams 3.1 and 3.1' of the associated rear wheel 3 and/or 3' are hinged with a pivot axis approximately parallel to the first frame part 1 and/or in longitudinal direction of the first frame part 1 perpendicular to the longitudinal extension of the cross-member 2, so that the axle beam 3.1, 3.1' which, in the operating position of FIG. 1, is oriented in extension of the cross-member 2 is adapted to be pivoted in a position rotated about approximately 90°, as is illustrated in FIG. 2 in the carrying position in which the axle beams 3.1., 3.1' are positioned approximately perpendicular to the longitudinal extension of the cross-member 2. The rear wheels 3 and 3' are rotatably connected with the axle beam 3.1 and 3.1' and/or mounted rotatably on an end of each axle beam.

In order to pivot the two axle beams 3.1 and 3.1' from the operating position in FIG. 1 to the carrying position in FIG. 2, the two axle beams are each pivotally connected via a guide rod 10 and/or 10' with the lower end of the associated frame struts 4.1 and/or 4.2, so that, when folding up the second frame part 4 which is positioned approximately horizontal in the operating position in FIG. 3 the two axle beams 3.1 and 3.1' are, via the guide rods 10 and 10', pivoted relative to the cross-member 2 in the carrying position in FIG. 2 in which the plane of the rear wheels 3 and 3' is approximately parallel to the plane of the folded frame parts 1 and 4.

Figure 4:
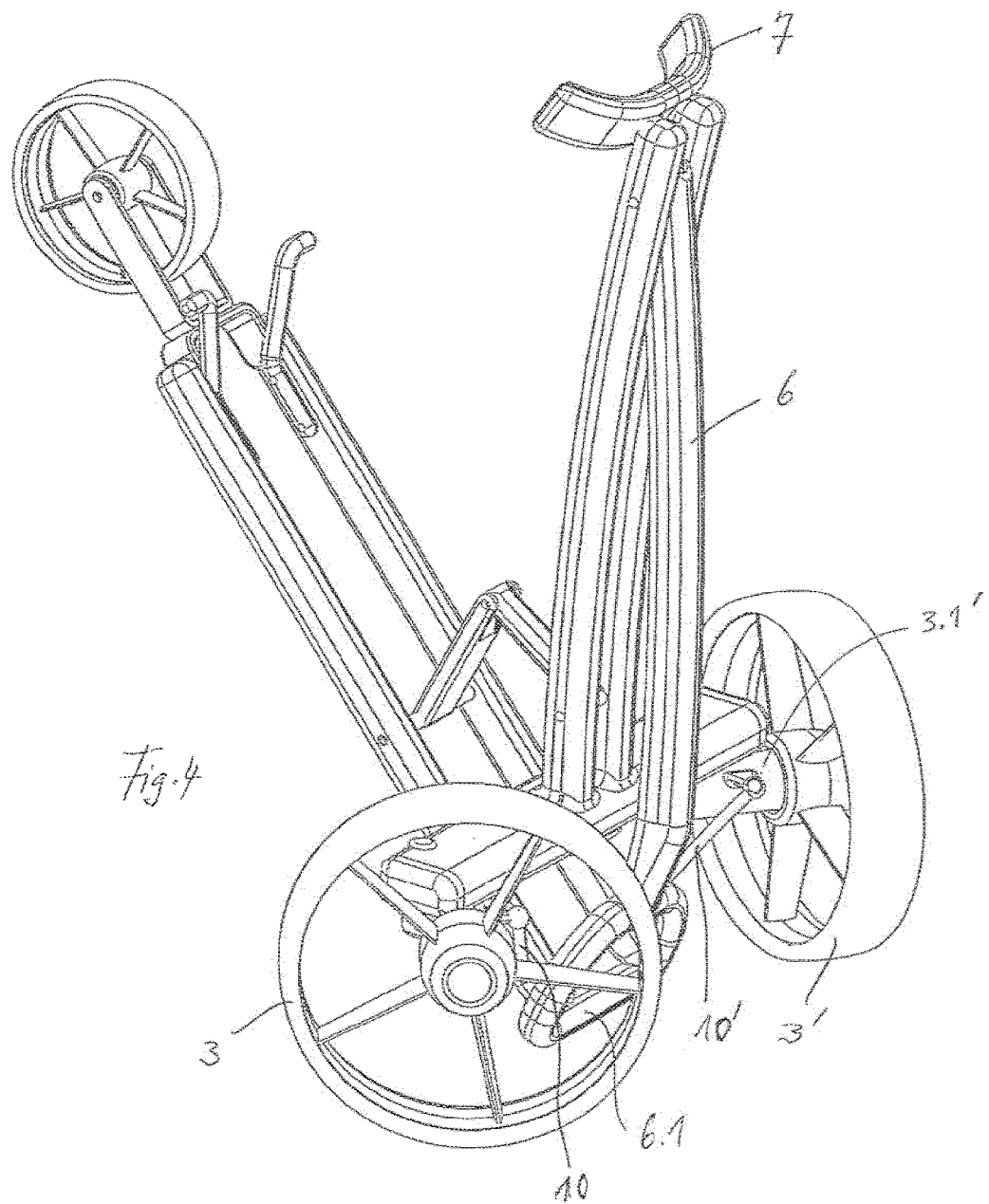

During folding from the operating position in FIG. 1, first of all the handle 6 may be pivoted downward, as is illustrated in FIGS. 3 and 4, so that the grip 6.1 is positioned approximately between the two rear wheels 3 and 3', whereupon the second frame part 4 is pivoted upward in the direction of the arrow approximately parallel to the first frame part 1, wherein the toggle lever 9 is angled and the rear wheels 3 and 3' are pivoted via the guide rods 10 and 10', so that the carrying position illustrated in FIG. 2 results, in which the plug-in bracket 7 at the upper end of the first frame part 1 may be used as a carrying handle.

Prior to or after the folding up of the second frame part 4 the front wheel 5 is, by pulling it away from the second frame part 4 against the force of a spring of a lock (not illustrated), pivoted with the wheel holding bracket 5.1 about the axis thereof, so that the rotational axis of the front wheel 5 extends approximately perpendicular to the cross-member 2.

Various modifications of the construction described are possible. Advantageously, the wheel holding bracket 5.1 of the front wheel 5 is designed to be, along its pivot axis which extends in the longitudinal direction of the second frame part 4, extracted and retracted relative to the second frame part 4, so that the driving position of the front wheel in the operating position of FIG. 1 can also be positioned at a larger distance from the front end of the horizontally positioned second frame part 4. For this purpose, a rod may extend between the two frame struts 4.1 and 4.2 in the direction of the pivot axis on the bracket 4.3, wherein the wheel holding bracket 5.1 is extractable along this rod and is retractable again in the carrying position.

For locking the individual positions of the front wheel 5, on the one hand, and the rear wheels 3, on the other hand, different locking devices known per se may be provided which may be spring-loaded. The same applies for the position of the handle strut 6 relative to the first frame part 1.

Instead of the toggle lever 9 between the first and second frame parts 1 and 4, a pressure spring may also be hinged by which the two frame parts 1 and 4 are pressed apart in the operating position and which is, during folding of the two frame parts, for instance, displaced with one end along one of the frame parts, so that it does not press apart the two frame parts any longer.

Furthermore, different holding devices may be provided for the golf bag G to be supported on the frame parts 1 and 4. For instance, the curved plug-in bracket 7 for plugging into tongues on the golf bag may also be replaced or supplemented by a band adapted to be placed about the golf bag and holding it on the first frame part 1.

In accordance with a further modification the frame parts 1 and 4 may be designed in some other way, for instance, by a single frame strut instead of the two frame struts illustrated. The frame parts 1 and/or 4 may also be designed as elongated plates.

The individual support struts 8.1 and 8.2 which are rigidly fastened to the second frame part 4 in the illustrated embodiment, may also be formed by another support 8, for instance, in the form of a bracket or a plate between the two frame struts 4.1 and 4.2.

Figure 6:
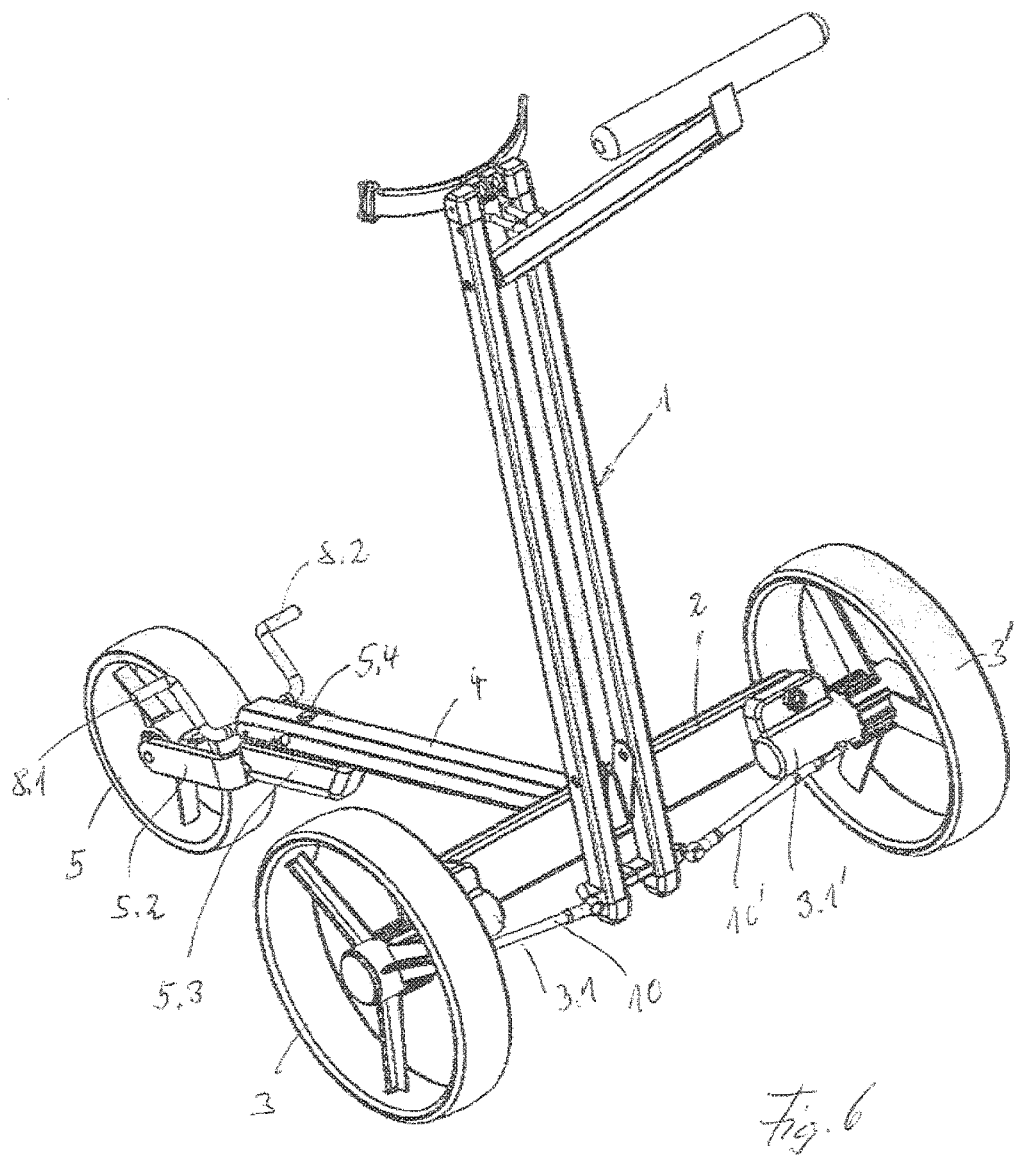
FIG. 6 is a second embodiment in perspective view.

FIG. 6 illustrates a second embodiment of the transport carriage in a perspective view. The front wheel 5 is held rotatably by an approximately L-shaped bracket 5.2, the short leg of which extends transversely to the wheel plane in the position of FIG. 6. This short leg is connected, by a pivot axis extending in the wheel plane in FIG. 6, with a guide body 5.3 extending along the second frame part 4 in FIG. 6. This guide body 5.3 is connected with the second frame part 4 by a pivot axis 5.4 extending transversely to the rotational axis of the front wheel 5 in FIG. 6. Via the bracket 5.2 the plane of the front wheel may be pivoted about approximately 90° while the guide body 5.3 may be pivoted relative to the second frame part 4 about approximately 180°, as is illustrated in FIG. 7.

At the same time, the pivot axis of the bracket 5.2 is extendable and retractable in a telescope manner on the guide body 5.3.

This structure makes it possible to tilt the front wheel 5 downward in the carrying position, in contrast to the upward arrangement in FIG. 2. In other words, the front wheel 5 may be hinged to the second frame part 4 in various ways in a pivotal and extendable manner.

Figure 7:
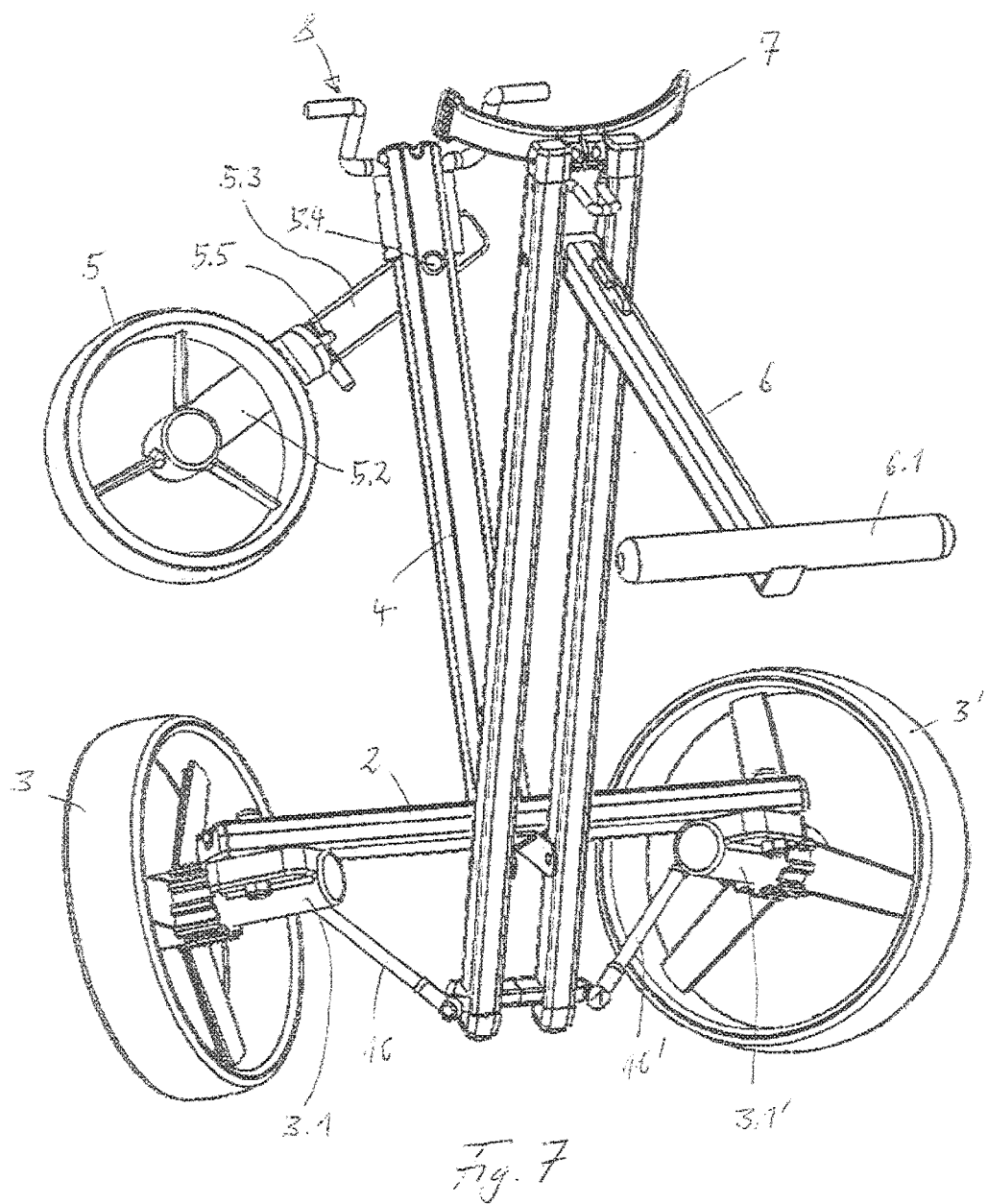
FIG. 7 is a view of an intermediate position during collapsing of the transport carriage.

FIG. 7 illustrates a latch pin 5.5 on the bracket 5.2 which latches in a notch on the guide body 5.3 in the respective pivot position so as to fix the front wheel 5 in the respective pivot position relative to the guide body 5.3 which may also be provided with a latch relative to the second frame part 4.

Like in the first embodiment, also in the second embodiment the cross-member 2 is formed in the kind of a narrow plate which is, however, in contrast to the first embodiment, connected rigidly, e.g. by welding, with the second frame part 4 such that the plane of the cross-member 2 extends approximately perpendicular to the second frame part 4, as illustrated in FIG. 6, so that, when the second frame part 4 is pivoted upward in FIG. 7, the cross-member 2 is also pivoted therewith.

Figure 8:
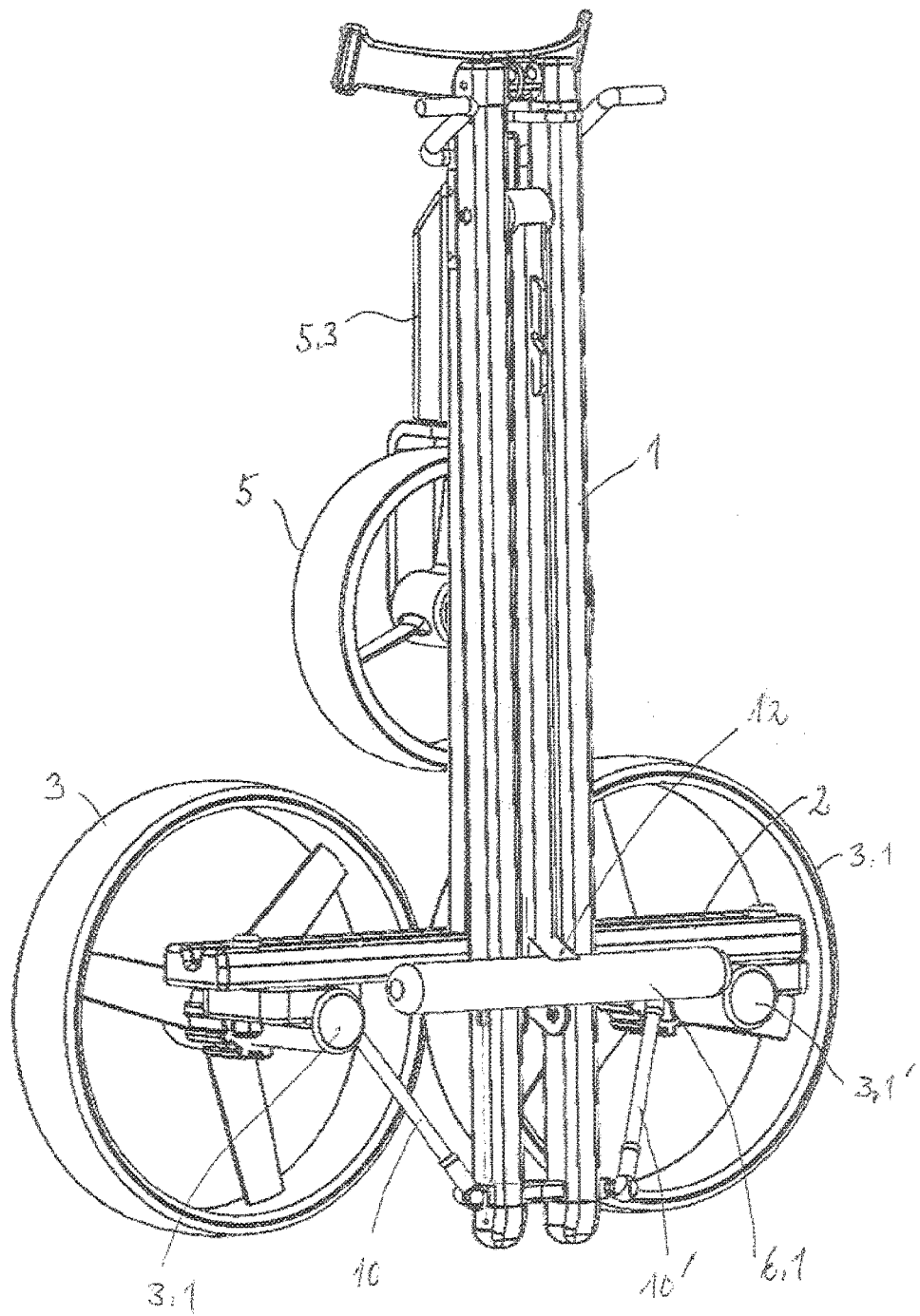
FIG. 8 is a perspective view of the second embodiment in the carrying position.

The cross-member 2 may be pivoted with the second frame part 4 from the operating position in FIG. 6, in which the plane of the cross-member 2 is approximately parallel to the longitudinal extension of the first frame part 1, about approximately 90° to the carrying position in FIG. 8 in which the plane of the cross-member 2 is approximately perpendicular to the first frame part 1.

The cross-member 2 itself is pivotally connected with the first frame part 1 via a U-shaped bracket, wherein the two legs of this U-shaped bracket are hinged to the end regions of the two struts of the first frame part 1.

As is shown by a comparison of FIG. 1 and FIG. 6, the cross-member 2 is, in the operating position of FIG. 6, positioned edgewise in relation to the embodiment pursuant to FIG. 8, so that the axle beams 3.1 and 3.1' are hinged to the rear side of the cross-member 2. In the folded position pursuant to FIG. 8 the running wheels 3 are then positioned at the same side as the down-folded front wheel 5, so that a compact structure results in the carrying position.

The support 9 between the first frame part 1 and the second frame part 4 provided in the first embodiment is not available in the second embodiment pursuant to FIGS. 6 to 8. The support in the operating position is taken over by the golf bag placed between the holders 7 and 8.

The handle 6 is formed to be straight in the second embodiment and may be folded in between the two struts of the first frame part 1 in the folded position, wherein the grip 6.1 may be fixed to the frame part 1 by means of a latch, as is indicated in FIG. 8 with 12.

The transport carriage described may also be provided with an electric drive motor by which the rear wheels 3 can be driven. Preferably, electric motors with a gear are integrated in each of the axle beams 3.1 and 3.1'. An appropriate control panel with a battery element may be provided at the top of the first frame part 1.

The transport carriage described cannot only be used for golf bags, it is also suitable for elongate containers leaning against the first frame part 1 and resting on the second frame part. In other words, the transport carriage described can be used in various regards.

FIGS. 1 through 8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical direction of the figures with respect to gravity and relative to the ground, and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A three-wheeled transport carriage for a golf bag, comprising:
    a first elongated frame part having an end region thereof,
    a second elongated frame part having an end region and a free end region, the end region of the second frame part attached to the end region of the first frame part, wherein the second frame part can be pivoted relative to the first frame part, and
    a front wheel, two rear wheels, two axle beams, and two guide rods, each rear wheel rotatably mounted to a corresponding one of the axle beams,
    wherein a pivotal connection between each axle beam and an end region of a corresponding one of the first and second frame parts is formed by a guide rod,
    wherein at the free end region of the second frame part, the front wheel is pivotally attached via a wheel holding bracket with a pivot axis by which a plane of the front wheel is pivotable about approximately 90°,
    wherein the rear wheels are hinged in a pivotal manner to end regions of an elongated cross-member in a hinge region between the first and second frame parts such that their rotational axes can be pivoted from a position approximately in elongation of the cross-member to a position approximately perpendicular to the cross-member, and vice versa,
    wherein the rear wheels are hinged to the cross-member in a pivotal manner about approximately 90° by the axle beams, and
    wherein when the first and second frame parts are pivoted relative to each other, each axle beam is pivoted via the corresponding guide rod about approximately 90° relative to the cross-member.

2. The transport carriage according to claim 1, wherein the cross-member is rigidly connected to the first frame part at a lower end thereof.

3. The transport carriage according to claim 1, wherein the cross-member is rigidly connected to the second frame part and hinged in a pivotal manner to the first frame part.

4. The transport carriage according to claim 3, wherein the wheel holding bracket is adapted to be extended and retracted relative to the second frame part along the pivot axis thereof.

5. The transport carriage according to claim 1, wherein the wheel holding bracket is adapted to be extended and retracted relative to the second frame part along the pivot axis thereof.

6. The transport carriage according to claim 1, wherein a support device is provided between the first and second frame parts which holds the first and second frame parts in an operating position at an angle relative to each other and allows for pivoting of the first and second frame parts relative to each other.

7. The transport carriage according to claim 1, wherein a handle is hinged in a pivotal manner to a free end of the first frame part.

8. The transport carriage according to claim 1, wherein a holding and/or support device for a golf bag is attached to the first and second frame parts, respectively.

9. The transport carriage according to claim 8, wherein a curved plug-in bracket to be plugged into tongues on the golf bag is attached to the first frame part.

10. The transport carriage according to claim 8, wherein a holder projecting from the second frame part is attached to the second frame part for supporting the golf bag.

11. The transport carriage according to claim 1, wherein an electric drive motor for the rear wheels is integrated in the axle beams.

12. The transport carriage of claim 1, wherein electric motors with a gear are integrated in each of the axle beams.

13. A three-wheeled transport carriage, comprising:
    a first elongated frame part having an end region thereof,
    a second elongated frame part having an end region and a free end region, the end region of the second frame part attached to the end region of the first frame part, wherein the second frame part can be pivoted relative to the first frame part,
    a front wheel, two rear wheels, two axle beams, and two guide rods, each rear wheel rotatably mounted to a corresponding one of the axle beams,
    wherein a pivotal connection between each axle beam and the end region of a corresponding one of the first and second frame parts is formed by a guide rod,
    wherein at the free end region of the second frame part, the front wheel is pivotally attached via a wheel holding bracket with a pivot axis by which a plane of the front wheel is pivotable about approximately 90°,
    wherein the rear wheels are hinged in a pivotal manner to end regions of an elongated cross-member in a hinge region between the first and second frame parts such that their rotational axes can be pivoted from a position approximately in elongation of the cross-member to a position approximately perpendicular to the cross-member, and vice versa, and
    wherein when the first and second frame parts are pivoted relative to each other, each axle beam is pivoted via the corresponding guide rod about approximately 90° relative to the cross-member.

14. The transport carriage according to claim 13, wherein the wheel holding bracket is adapted to be extended and retracted relative to the second frame part along the pivot axis thereof.

15. The transport carriage according to claim 13, wherein a holding and/or support device for a golf bag is attached to the first and second frame parts, respectively.

16. The transport carriage according to claim 15, wherein a curved plug-in bracket to be plugged into tongues on the golf bag is attached to the first frame part.

17. The transport carriage according to claim 13, wherein the three-wheeled transport carriage is for a golf bag.

* * * * *